United States Patent [19]
Goldring

[11] Patent Number: 5,603,024
[45] Date of Patent: Feb. 11, 1997

[54] LOSSLESS DISTRIBUTION OF TIME SERIES DATA IN A RELATIONAL DATA BASE NETWORK

[75] Inventor: Robert D. Goldring, Morgan Hill, Calif.

[73] Assignee: International Business Machines Corporation, Armonk, N.Y.

[21] Appl. No.: 647,533

[22] Filed: May 15, 1996

Related U.S. Application Data

[63] Continuation of Ser. No. 134,229, Oct. 8, 1993, abandoned.
[51] Int. Cl.⁶ .................................................. G06F 17/30
[52] U.S. Cl. ............................ 395/619; 364/DIG. 1; 364/282.1; 364/222.81
[58] Field of Search ................................ 395/600

[56] References Cited

U.S. PATENT DOCUMENTS

| | | | |
|---|---|---|---|
| 5,280,611 | 1/1994 | Mohan et al. | 395/600 |
| 5,280,612 | 1/1994 | Lorie et al. | 395/600 |
| 5,317,731 | 5/1994 | Dias et al. | 395/600 |
| 5,347,632 | 9/1994 | Filepp et al. | 395/200 |
| 5,369,757 | 11/1994 | Spiro et al. | 395/575 |
| 5,440,735 | 8/1995 | Goldring | 395/600 |
| 5,455,945 | 10/1995 | VanderDrift | 395/600 |
| 5,530,855 | 6/1996 | Satoh et al. | 395/600 |

OTHER PUBLICATIONS

Kahler et al, "Extended Logging for Database Snapshot Refresh", Proceedings of the 13th International Conference on Very Large Data Bases, pp. 389–398, Sep. 1–4, 1987.

*Primary Examiner*—Wayne Amsbury
*Attorney, Agent, or Firm*—Baker, Maxham, Jester & Meador

[57] ABSTRACT

A computer processing system that receives sequences of changes to a data base and records them into an activity log for later retrieval also maintains a consistent change data table that contains sufficient change information for each of the changes to the data base such that the changes can be propagated through multiple copies of the data base by consulting the consistent change data table. The consistent change data includes information sufficient to permit reconstruction of the data base to reflect the condition of the data base at any moment of time in the activity log. Because the consistent change data is complete, it permits producing multi-generational copies of data base tables for replication from one copy level to any other subsequent level, or iteration, of copy.

3 Claims, 8 Drawing Sheets

| UPDATE 2 | INTENT SEQUENCE=600 | OPERATION=UPDATE | COMMIT SEQUENCE=900 | TIME=9:04 AM |
|---|---|---|---|---|
| UPDATE 3 | INTENT SEQUENCE=700 | OPERATION=UPDATE | COMMIT SEQUENCE=900 | TIME=9:04 AM |
| UPDATE 4 | INTENT SEQUENCE=800 | OPERATION=UPDATE | COMMIT SEQUENCE=900 | TIME=9:04 AM |

| COPY SERVER | COPY OWNER | COPY TABLE ID | TIME STAMP VALUE | PRUNE LIMIT SEQUENCE NUMBER | CONTROL SERVER | COPY STRUCTURE ID |
|---|---|---|---|---|---|---|

LOSSLESS DISTRIBUTION OF TIME SERIES DATA IN A RELATIONAL DATA BASE NETWORK

This application is a continuation of application Ser. No. 08/134,229, filed Oct. 8, 1993, now abandoned.

CROSS-REFERENCE TO RELATED APPLICATIONS

This application is related to the application entitled "Consistent Recreation of Events from Activity Logs" by Robert Goldring filed Oct. 8, 1993 and assigned Ser. No. 08/134,766, abandoned and the application entitled "Simplified Relational Data Base Snapshot Copying" by Robert Goldring, filed Oct. 8, 1993 and assigned Ser. No. 08/134,763, now U.S. Pat. No. 5,440,735.

BACKGROUND OF THE INVENTION

1. Field of the Invention

This invention relates generally to computer systems for managing changes to collections of data and, more particularly, to systems for propagating change histories to data base copies.

2. Description of the Related Art

A relational data base comprises a collection of tables containing data. A relational data base manager permits users and applications software to create, change, or destroy the data in the tables, the relationships between the tables, and even the structure of the tables. A query language, such as SQL, is used to manipulate the data base and retrieve query results. Many relational data bases are transaction-oriented, meaning that a data table change comprises a transaction that involves two or more related activities. For example, in a transaction-oriented banking application, the first activity might comprise a debit to a table and a second activity might comprise a credit to another table, followed by an SQL commit command that completes the transaction by implementing the first two activities to thereby change the affected tables. The first and second activities are not actually implemented until there is a commit command. Thus, the transaction is treated in an "all-or-nothing" manner and is referred to as an atomic unit of work. Preserving such atomicity, or completeness of operation, ensures integrity of the tables.

In many data base systems, it is desirable to maintain an accurate history of the changes to the data tables. The history can be used, for example, to recover from system failures or equipment malfunctions by providing a record of the transactions that can be read for recreating the state of the tables at any point in time. Such systems include processes, or programming routines, that create change histories by writing changes to an activity log in the order in which they are received. Thus, several transactional changes might be received before a commit command is received for the first transaction. Some transactions might not ever be committed and instead might be aborted.

An activity log contains the minimum amount of information necessary for data recovery. Entries in an activity log, for example, might comprise simply "before" and "after" copies of a data table row, or might comprise very specific change operations that define the row and column of a data table for which a change is made and define the changed value. Location markers in the activity log likely refer to internal computer locations, rather than table or variable names. Because activity logs are designed for recovery operations and not analysis operations, it can be rather difficult to recreate the data base changes to permit useful analysis of the change history.

Many relational data base management systems make copies of selected portions of a data base, such as when returning the response to a user SQL query. These copies are often referred to as "snapshots" of the data base, because they reflect the condition of the data base at a particular point in time. Snapshots are made periodically for a variety of purposes. The system may make copies for use by system processes in implementing data base changes. Snapshots also are used to create additional copies of data tables for concurrent use by multiple users. Snapshots are read-only tables that are created out of the original source data base tables and cannot be changed. After a snapshot has been produced, it can be refreshed to reflect all changes to the original user data table since the creation of the initial snapshot or the time of the last refresh operation.

It is known to reduce the amount of information necessary to refresh a snapshot. For example, rather than returning to the source user tables to replace an initial snapshot with a complete, updated copy of a user table, a data base management system can refresh an initial snapshot by propagating update information received since the initialization or the last prior update through the snapshot copies. Such information can be obtained from the activity log, but is lost after being applied, or propagated, to the first snapshot. Therefore, updated snapshot copies cannot be used to update other snapshots. It would be necessary to repeatedly consult the activity log and apply the recorded updates to each initial snapshot copy to be updated. As noted above, this can be a difficult task because activity logs are designed primarily for recovery operations.

Activity logs often are not useful for user analysis of change history because they are not accessible to a user through an interface such as SQL or at least contain information that is not designed for easy manipulation. This is because activity logs are designed for recovery operations, not access and manipulation operations. Thus, even if the activity log data were readily available to users for interactive query, most users would not find the data to be meaningful.

For example, time series data does not accompany subsequent snapshot copies. As a result, it can be virtually impossible to locate the proper starting point in the activity log to recreate the changes to the data base in the order in which the changes were committed. Snapshot copy deletion operations are permanent, so that knowledge of deletions is lost from subsequent copies. Knowledge of deletions would be necessary to maintain subsequent deletion operations with the minimal information technique. Thus, snapshot copies that are refreshed are not useful as sources for refreshing subsequent snapshots, referred to as multi-generational copies, with the same minimal information technique. As a result, for complete information, refreshed snapshots must be obtained directly from the original data table and activity log. This places a heavy burden on the data base manager to participate in the refresh of every snapshot.

From the discussion above, it should be apparent that there is a need for a system that permits multiple copies of data tables to be made specifying only the changes to a base copy of the table without losing change information from copy to copy. The present invention satisfies this need.

SUMMARY OF THE INVENTION

In accordance with the invention, a computer processing system that receives sequences of updates to source data tables in a data base and records them into an activity log for later retrieval, generates a consistent change data table from the retrieved activity log such that the consistent change data table contains sufficient change information to refresh copies of the source data through multiple generations of target copies by consulting the consistent change data table and applying the table entries to the last prior refreshed source table. The consistent change data table contains committed change operations retrieved from the activity log in the order in which they were committed, beginning with a time no earlier than the last prior refresh. Because the consistent change data can be designated to be complete, it permits producing multi-generational copies of data base tables for replication from one copy level to any other subsequent level, or iteration, of copy without losing any change information. In this way, it is unnecessary for the data base manager of the computer processing system to access the source data base table with every refresh and multi-generational copies can be made efficiently and without loss of information. In addition, the structure and relationships of the data base tables do not have to be changed to incorporate the consistent change data table, making it easier to implement the invention with existing data processing systems.

In a transaction-oriented relational data base, the consistent change data table includes time stamp information associated with each committed change operation for an update, and when complete is sufficient to permit reconstruction of the user base table to reflect the condition of the base table at any moment of time in the activity log. The complete consistent change data table contains commit time information for placing transactions in the order in which they were committed, sequence information for ordering conflicting updates within a single transaction, and operational information for specifying whether a change was an insert, update, or delete operation. For example, the commit time information can be represented in the consistent change data table by a column containing a time stamp value and a column containing a commit sequence number that identifies a committed transaction. The sequence information can be represented by a column containing sequence intent numbers for the activities making up a transaction and the operational information can be provided by a column containing an operation identifier that indicates whether a change was an insert, update, or delete operation. Each time the snapshot is refreshed with update information, the consistent change data is propagated with the update information and permits accurate reconstruction of the data table condition before and after the changes.

In the process described above, the consistent change data values remain invariant. A snapshot is not used as a source for subsequent generations of copies unless all updates are in sequence. That is, if all the sequence numbers are in serial order, then no updates are missing. In this way, no time series information is lost from snapshot copies, regardless of the number of times a snapshot is copied. Each snapshot can be used as a source for refreshing many other snapshots of a table. If desired, an attribute can be added to the propagated information to permit selecting between condensed data propagation using only current snapshot values and detailed propagation using detailed time series data.

Other features and advantages of the present invention should be apparent from the following description of the preferred embodiment, which illustrates, by way of example, the principles of the invention.

DESCRIPTION OF THE PREFERRED EMBODIMENT

Figure 1:
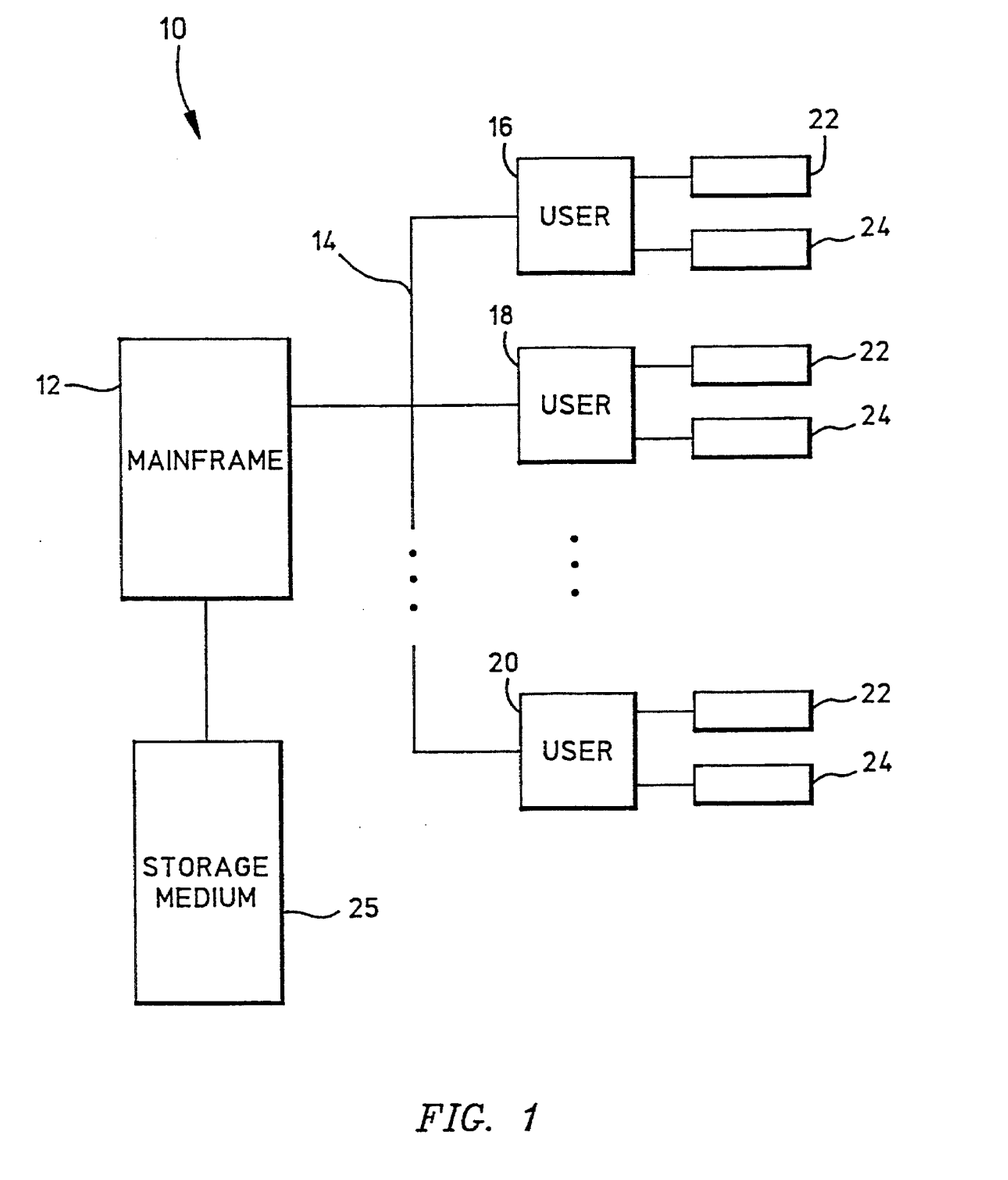
FIG. 1 is a block diagram of a computer system constructed in accordance with the present invention.
Figure 2:
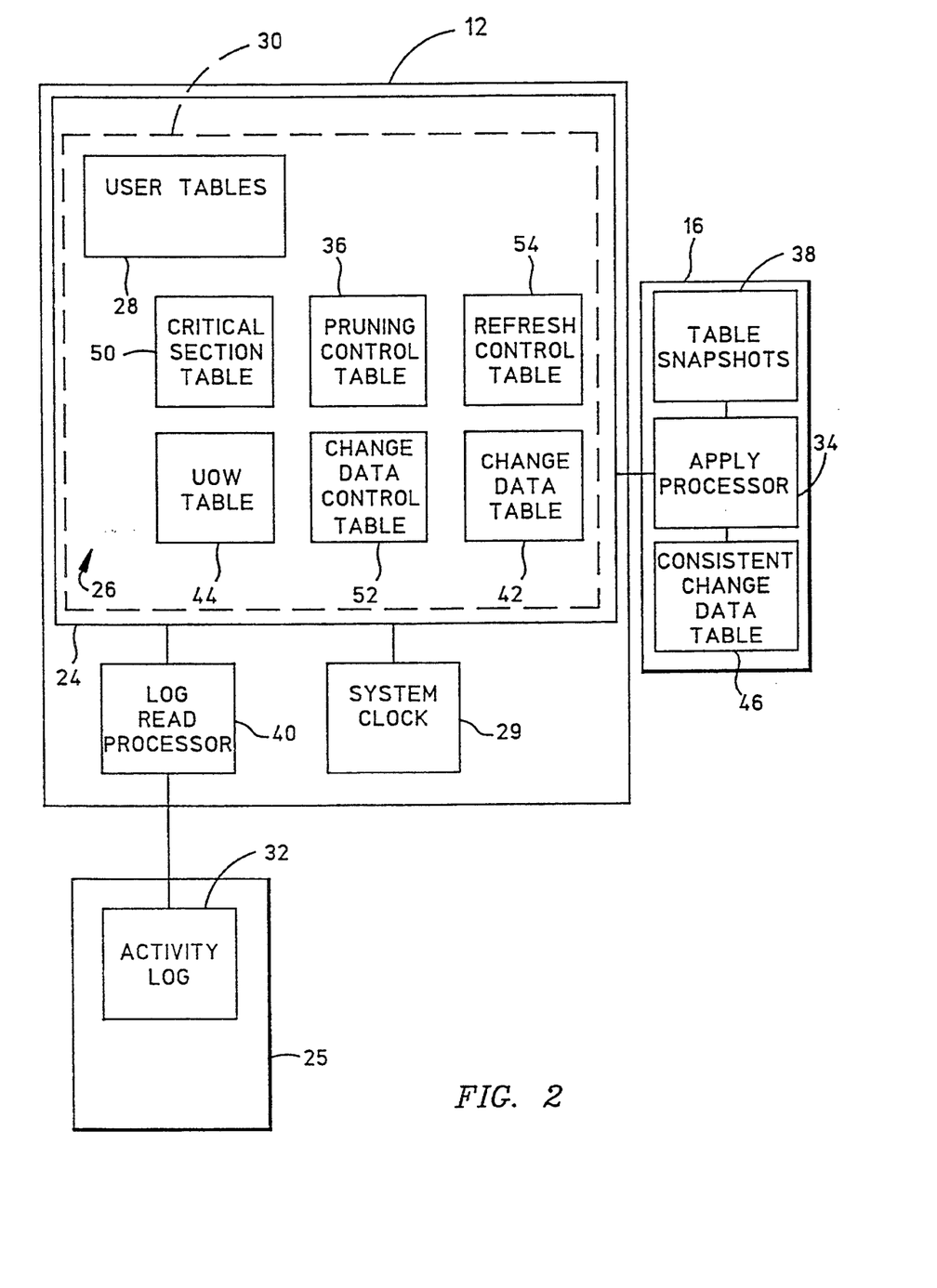
FIG. 2 is a detailed block diagram of the computer mainframe and one of the users illustrated in FIG. 1.

With reference to the block diagrams of FIG. 1 and FIG. 2, a computing system 10 constructed in accordance with the present invention includes a central processor 12, such as an International Business Machines Corporation (IBM Corporation) "System/390" mainframe computer, and a plurality of users connected to the central processor by a network 14. In FIG. 1, three users 16, 18, 20 are illustrated for purposes of example. Each user comprises a processor, such as an IBM Corporation "PS/2" personal computer, and includes a user display device, such as a video display 22, and an interactive input device, such as a keyboard 24. A non-volatile storage medium 25 is connected to the mainframe computer. FIG. 2 shows the mainframe computer and one of the users 16 in greater detail. The flow of data is indicated by the solid lines.

As illustrated in FIG. 2, the mainframe computer 12 includes a plurality of data tables 26 including user tables 28 defined by the users, only one user 16 of which is shown for simplicity. The mainframe also includes a system clock 29 that is constantly updated while the mainframe is operated and controls the mainframe operations. A data base manager 30 provides an interface through which users can create and then update the user tables and also can retrieve, or query, selected portions of the tables. The results of a query may be itself stored as a snapshot copy of the selected portion of a table. The data base manager automatically assigns transaction numbers to the user updates and records the updates and transaction numbers in an activity log 32 that is kept in the non-volatile storage medium 25. The data base manager can be any one of many data base management systems well-known to those skilled in the art. For example, the data base manager can be the IBM Corporation data base management system known as "DB2". The DB2 system is a system that provides an interactive interface in the SQL language, which is well-known to those skilled in the art.

Because users are continually updating the user tables 28, the snapshots must be periodically updated, or refreshed. After snapshots are initialized, they are preferably refreshed by propagating update information committed since the time of snapshot initialization or the last prior update rather than by returning to the source user tables 28. This is commonly referred to as a differential refresh operation. Conventionally, update information is obtained from the activity log 32, but is lost after being applied, or propagated, to the first snapshot. To avoid repeatedly consulting the activity log for update information or asking the data base manager for access to the updated user tables for every refresh, the system 10 in accordance with the invention places time series change information in a change data table to avoid loss of the change information obtained from the activity log 32 and permit using updated snapshot copies to update other snapshots. In this way, it is unnecessary for the data base manager 30 of the computer processing system to access the user data base tables 28 with every refresh and multi-generational snapshot copies can be made efficiently and without loss of information. In addition, the structure and relationships of the data base tables do not have to be changed, making it easier to implement the invention with existing data processing systems.

As noted above, a user 16 requests snapshot copies through the data base manager 30. The data base manager resides in program memory of the mainframe computer 12 and provides an interface for the users. The data base manager is illustrated in FIG. 2 with dashed lines to emphasize that it provides an interface between the processes and tables in the mainframe computer and all outside processes. A user 16 can communicate with the data base manager through the user video display 22 and keyboard 24 to define the user tables 28 and update them.

The relational data base system 10 comprises a transaction oriented system in which the data base manager 30 automatically records user table change operations into the activity log 32, thereby maintaining a change history of the data base. The change operations comprise transactional updates that are completed by a user through a commit command, a standard SQL process known to those skilled in the art. Alternatively, changes can be aborted by an SQL roll-back command. Such complete updates constitute a self-contained, or atomic, unit of work. Each time a user begins an update, the data base manager will assign the update a transaction number comprising a unique, ascending binary number and will record the information in the activity log 32. Thus, the data base manager automatically writes the change operations and commit or roll-back operations into the activity log, along with their associated binary transaction numbers.

An Apply Processor 34 preferably comprises a software process that resides in each user computer 16, 18, 20. The Apply Processor associates time series data with data base changes by defining a data base table 36, which will be referred to as the Pruning_Control table, to include a column in which a time value is recorded whenever a new copy of a user table 28 is initialized. Each new copy of a table or of a portion of a table constitutes a snapshot 38 that is stored in the memory of the computer for the user who requested the copy. The time value from the system clock 29 can be located in the activity log and provide a time association for the other updates in the log. The Apply Processor 34 can comprise a software process that resides in program memory of each user 16, 18, 20. As more fully described in the above referenced related application entitled "Consistent Recreation of Events from Activity Logs" by Robert Goldring, the present inventor, the Apply Processor takes advantage of the automatic writing to the activity log 32 by the data base manager 30 by generating the Pruning_Control data table 36 and updating the time stamp values contained therein. The data base manager interprets a modification to the Pruning_Control table as just another user modification of a data table and therefore assigns the event a transaction number. The data base manager then writes the time stamp value change operation to the activity log 32 with the transaction number. The time stamp values then can be located in the activity log, along with their corresponding sequence numbers.

The Apply Processor 34 periodically writes the time stamp value to the Pruning_Control table 36. For example, when a user 16 wants to examine one of the user data tables 28, the user must first initialize a snapshot copy. The Apply Processor selects the copy initialization as one of the commands for which it will also update the Pruning_Control table. A copy initialization is commonly referred to as a full refresh operation. As described above, subsequent requests for a snapshot need not initialize yet another copy of the user table. Rather, only the change operations since the time of last initialization or update need be propagated to each user. The change operations can be applied to the snapshot copy kept by a user, thus ensuring a current data table copy. Such an update is referred to as a differential refresh operation. The change operations since the time of initialization or last differential refresh can be easily located in the activity log by scanning the log for time series data from among the update change operations. The updates themselves may not include time series data.

To read the activity log, the system 10 includes a Log Read Processor 40 that reads the entries in the activity log 32 and transfers the information from the log to two system tables, a Change_Data table 42 and a Unit_of_Work (UOW) table 44. The Log Read Processor preferably comprises a software process that resides in the mainframe computer 12. The system 10 generates one Change_Data table for each of the user source tables 28 and one global UOW table for the system. The Log Read Processor will read the activity log and will extract from the log, for insertion into the Change_Data table, data identifying the transaction, an intent sequence number for a change operation within a transaction, and an identifier of the type of change operation being performed. Time stamp information may optionally be inserted, as well. Those skilled in the art will recognize such parameters as being common to many different data base manager systems, though perhaps referred to by alternative names.

The Log Read Processor 40 also will extract, for insertion into the UOW table 44, data from the activity log 32 identifying the transaction, the commit sequence number, and a time stamp value corresponding to the approximate mainframe computer central processor time when the change operation was committed by a user. This time stamp value corresponds to the most recent time stamp value read from the activity log. The commit sequence number corresponds to the transaction identifier number of the commit command for a committed transaction. Thus, the UOW table will contain only committed updates. In the preferred embodiment, the Log Read Processor also extracts an authorization token associated for the transaction, but this is implementation-dependent and those skilled in the art will recognize that the authorization token may not be necessary for certain applications.

The change data noted above, including the change operation identifier that permits multi-generational snapshot copying without loss of change information, is placed in a Consistent_Change_Data table 46 by the Apply Processor 34. There is a Consistent_Change_Data table for each snapshot copy 38 of a user table 28. The Consistent_

Change_Data table includes only updates that have been committed and is created by performing an SQL join operation on the Change_Data 42 and UOW 44 tables. That is, after the Log Read Processor inserts information from the activity log 32 into the Change_Data and UOW tables, the Apply Processor will read both tables and, based on records with the same log sequence number, will join information in the tables according to transaction updates that have committed since the time of the previous time stamp value, or most recent differential refresh operation. As a result, the rows in the Consistent_Change_Data table will provide a listing of the update transactions in the order in which they were committed, sequence information used to order conflicting updates within a single transaction, and operational information used to specify whether a change was an insert, update, or delete operation.

In the preferred embodiment, the commit time information in the Consistent_Change_Data table 46 comprises a column containing the activity log time stamp value written into the Pruning_Control table 36 and a column containing a commit sequence number that identifies a committed transaction. The sequence information comprises a column containing sequence intent numbers that are sequential for the activities making up a transaction. If the Consistent_Change_Data table is said not to be condensed, then the sequence represents all intended updates committed during the interval defined by the oldest and youngest time stamped rows in the table. If the Consistent_Change_Data table is said to be condensed, then it will only contain the most recent version of each uniquely keyed row. A condensed Consistent_Change_Data table can be used as a source to synchronize snapshots to the time stamp value associated with the most recently updated row in the Consistent_Change_Data table. A Consistent_Change_Data table that is not condensed can be used to synchronize a snapshot to any time point within the interval defined by the oldest and youngest time stamps.

Finally, the operational information is provided by a column containing an operation identifier that indicates whether a change was an insert, update, or delete operation. This recreates the original transaction serialization at the user. Each time a snapshot copy is differentially refreshed with update information, the consistent change data is propagated with the update information and permits accurate reconstruction of the data table condition before and after the changes. That is, when a target snapshot is differentially refreshed by a source snapshot or user table, the rows in the Consistent_Change_Data table associated with the source having an updated commit sequence number are copied to the Consistent_Change_Data table associated with the target. This permits copying from Consistent_Change_Data table to Consistent_Change_Data table without losing information pertaining to updates. The actual operation of incorporating updates to a snapshot by applying change operations is carried out by an SQL process of the data base manager 30 well-known to those skilled in the art.

The Pruning_Control table 36 is used to indicate the number of user table copies provided to the users and also to contain the time stamp information. There is one row in the Pruning_Control table for each snapshot table 38 that is refreshed from the Change_Data table 42. The Pruning_Control table is defined by entries that specify the user name of a copy where the table copy is stored and will be refreshed, a time stamp, a pruning limit sequence number, an identifier for the user where the copy definition is stored, and an identifier for the copy structure. When a snapshot table copy is being initialized, the Apply Processor 34 sets the pruning limit sequence number to zero. Otherwise, the limit sequence number reflects the relative byte address in the activity log 32 where the change operation is located.

More particularly, there is one Pruning_Control table 36 for each user table/Change_Data table pair and there is one row in the Pruning_Control table for each snapshot copy that is refreshed from the same Change_Data table. That is, the table has one row for every copy being made of a user table. The Apply Processor 34 sets the pruning limit sequence number to zero for a snapshot full refresh operation (initialization of a snapshot copy). The Log Read Processor 40 periodically reads the Pruning_Control table, recognizes the zero value as an initialization, and replaces that zero value with a transaction sequence identifier corresponding to the activity log location of the associated initialization. After a differential refresh operation on a snapshot copy, in which change operations are applied to the snapshot copy under control of the data base manager 30, the Apply Processor changes the prune limit sequence number to the commit sequence number of the change operation that refreshed the associated snapshot.

The changing values of the pruning limit sequence numbers indicate the progress of the Apply Processor 34 in applying the change operations from the Consistent_Change_Data table to the snapshot copies. The Log Read Processor 40 makes use of this to prune the change data from the Change_Data tables, thereby preventing the change data from continuously enlarging the Change_Data tables. The Log Read Processor accomplishes this by periodically reading the Pruning_Control table 36 and identifying rows associated with the same user table. The Log Read Processor examines the pruning limit sequence numbers for the rows and deletes change operations from the Change_Data table that have commit sequence numbers less than the minimum in the Pruning_Control table. That is, the Log Read Processor assumes that, if all copies have been refreshed past a given commit sequence number, then it can safely delete any change data rows with a commit sequence number less than the given sequence number.

The Log Read Processor 40 also references a table called a Critical_Section table 50. The Critical_Section table is used to provide an implementation-independent means of blocking access to multiple snapshot tables when they are being updated. When a snapshot table is being updated, that table is registered in the Critical_Section table so that no other user is given access to the same table. In this way, users will not encounter conflicts over updates.

The Log Read Processor 40 also references a table called the Change_Data_Control table 52, which includes one row for each Change_Data table 42. The Change_Data_Control table will link each Change_Data table with one of the source user tables 28. The Change_Data_Control table provides a means of specifying a host of control parameters, including copy mode flags, table names, user identification, and the like. For example, the Change_Data_Control table preferably includes the name of the source user table whose updates are being propagated, the name of the Critical_Section table, the Change_Data table, the name of the Pruning_Control table 36, the sequence number of the oldest row remaining in the Change_Data table, a flag to specify whether the Change_Data table is condensed, flags to indicate whether the change data is transaction consistent or complete, along with similar parameters for the Consistent_Change_Data table.

Finally, the data tables 26 include a Refresh_Control table 54 associated with snapshot copies. The Refresh_

Control table contains identifiers for a source-based table and associated attributes, a target table and associated attributes, and an indication of how refresh operations will be scheduled and carried out. For example, a refresh algorithm specified as "FA" refers to a full refresh algorithm to append rows from a user table to the copy in accordance with log sequence numbers. A refresh algorithm can be specified as "FR" for full refresh with prior delete to replace the copy with the user table, a refresh algorithm of "AO" refers to automatic refresh with logic that completes a differential refresh operation if it is not possible to distinguish between reduced update activity and a disabled log read program, a refresh algorithm "AP" refers to an automatic refresh operation in which a failure is assumed and the differential refresh cycle is not completed if it is not possible to distinguish between reduced update activity and log read program failure, and, lastly, a refresh algorithm "EI" represents an execute immediate refresh operation.

The Refresh_Control table 54 also includes a time stamp value that is set to null initially and whenever a full refresh (initialization) is attempted and fails. The time value otherwise corresponds to the approximate value of the last successful full refresh operation, which should correspond to the previously read time value from the activity log 32. The Refresh_Control table also includes an attribute for interval minutes, which is the value in minutes for the refresh cycle time. At the expiration of the interval, the source table will be refreshed under control of the Apply Processor in accordance with the specified refresh algorithm.

Figure 3:
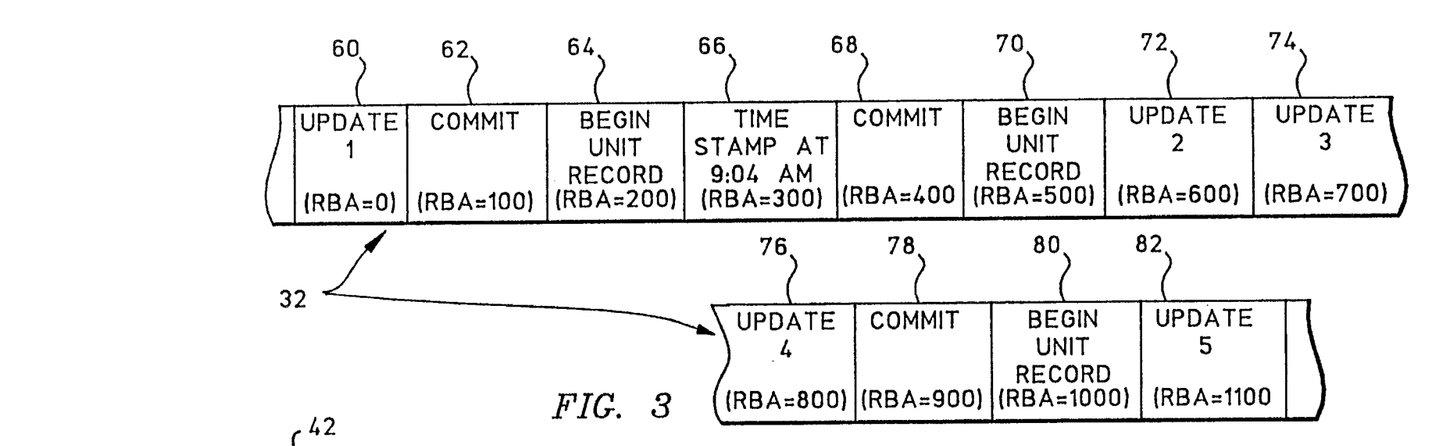
FIG. 3 is a representation of a portion of the activity log written by the system illustrated in FIGS. 1 and 2.

FIG. 3 represents a portion of the activity log 32 recorded by the data base manager 30 illustrated in FIG. 2. Various marker records and transition records are not shown for simplicity. The illustrated portion begins with an update event 60 indicated as Update 1 having a log sequence number, which in the illustrated system corresponds to the relative byte address (RBA), with a value of 0. A commit order 62 is the next event in the log, having an RBA of 100. A "Begin Unit of Recovery" record is the next recorded event (RBA=200) 64. A time stamp marker having a time value of 9:04 AM is the next event 66, indicating the initialization of a table copy. The time stamp marker has an RBA of 300. An associated commit order 68 is next, having an RBA of 400. The next Begin Unit of Work record 70 occurs with an RBA of 500. This RBA value becomes the unit of work identifier for the associated transaction. Following are three update events 72, 74, 76 having respective RBA values of 600, 700, and 800. The commit order for the three updates is the next event 78 in the log and has an RBA value of 900. Finally, a Begin Unit of Recovery record 80 (RBA=1000) and associated update 82 (RBA=1100) are the next events in the activity log.

Figures 4, 5:
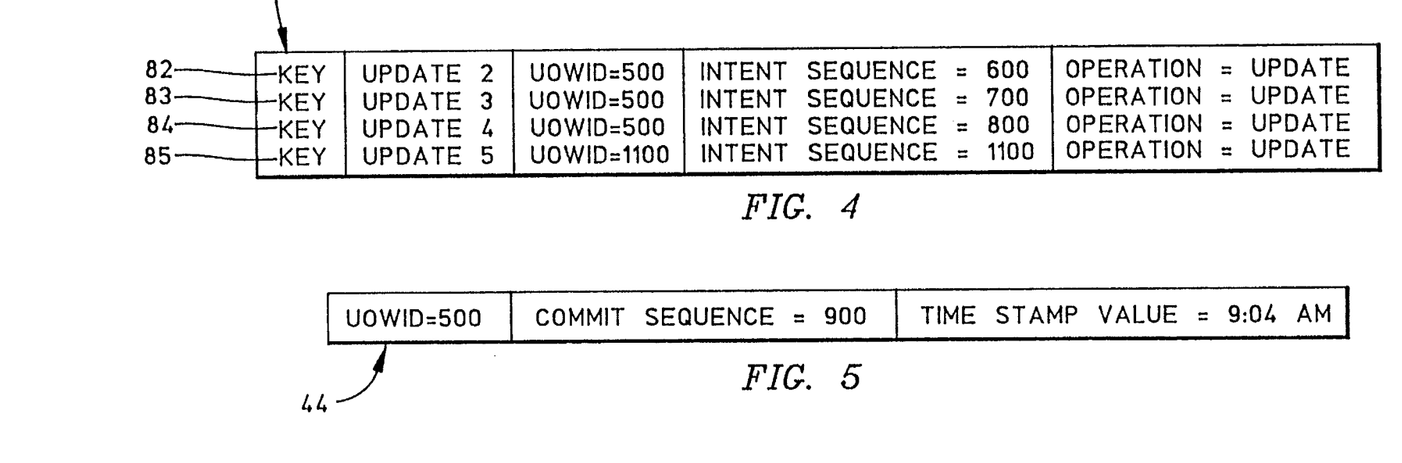
FIG. 4 is a representation of a row from the Change_Data table illustrated in FIG. 2.
FIG. 5 is a representation of a row from the Unit_of_Work table illustrated in FIG. 2.

FIG. 4 illustrates the Change_Data table rows generated by the Log Read Processor for the activity log portion of FIG. 3. The first column in the table lists the arbitrary key for indexing the table, selected as known to those skilled in the art. The next column corresponds to the activity log event, which in the illustrated log comprise update events. The next column contains the unit of work identifier, which corresponds to the RBA of the begin UR event for a transaction. This number identifies the transactional update. Thus, the first three rows 82, 83, 84 of the table have identical unit of work identifiers and the last row 85 has a different unit of work identifier associated with its begin UR event. The next column in the table includes the intent sequence number, which corresponds to the RBA value of the particular event. Hence, each row associated with a transaction has a different intent sequence number.

FIG. 5 illustrates the UOW table row generated by the Log Read Processor for the activing portion of FIG. 3. Only one entry is illustrated in the table because only one transaction from the activity log excerpt has committed. The unit of work corresponding to the update event having an RBA of 1100 has not yet committed. Thus, as described above, the UOW table includes columns for the unit of work identifier, the commit sequence number (which the Log Read Processor assigns as the RBA of the transaction commit order), and the time stamp value for the most recent time stamp read from the activity log.

Figure 6:
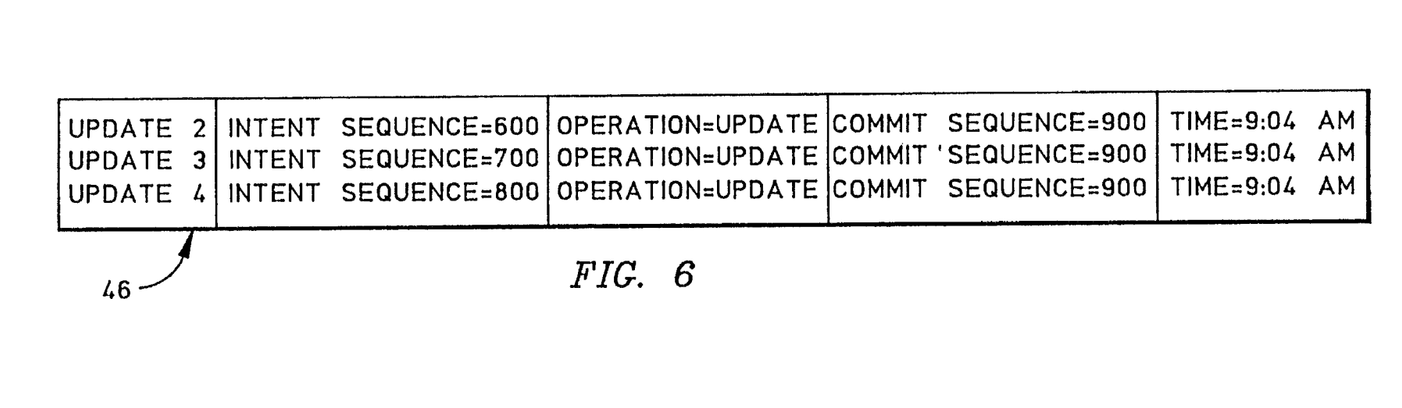
FIG. 6 is a representation of a row from the Consistent_Change_Data table illustrated in FIG. 2.

FIG. 6 illustrates the rows in the Consistent_Change_ Data table 46 generated from the join of the Change_Data table of FIG. 4 and the UOW table of FIG. 5. The columns of the table include the user change operation, the intent sequence number, the operation identifier, the commit sequence number, and the time stamp value. There is one row for each update operation of a committed transaction. Thus, the uncommitted transaction that is missing from the UOW table of FIG. 5, although present in the Change_Data table of FIG. 4, also is missing from the Consistent_ Change_Data table.

Figure 7:
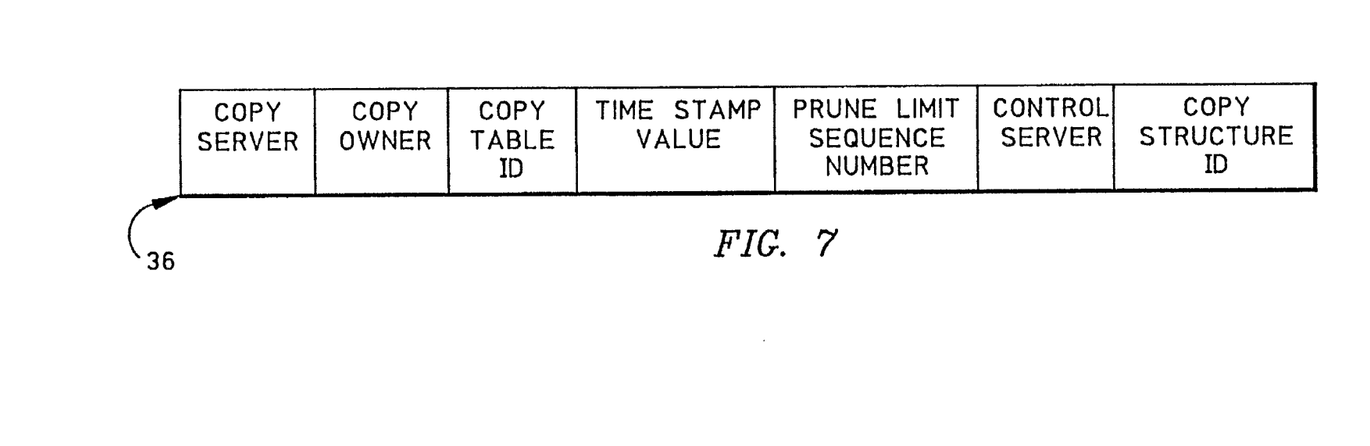
FIG. 7 is a representation of the structure of the Pruning_Control table illustrated in FIG. 2.

FIG. 7 illustrates the structure of a row in the Pruning_ Control table 36. The Pruning_Control table includes columns containing information identifying the copy server, which specifies the user associated with the row of the table, that is, the Apply Processor at which the associated snapshot copy is located. The Pruning_Control table also contains a column containing copy owner and copy table information, which is used defining refresh operations. The Pruning_ Control table also includes the time stamp value corresponding to the time stamp value of the associated transactional update, and includes a column for the prune limit sequence number discussed above. Finally, the Pruning_Control table includes columns that identify the control server to identify the location where the copy definition is stored and includes copy structure information for identifying the structure of the target copy.

Figure 8:
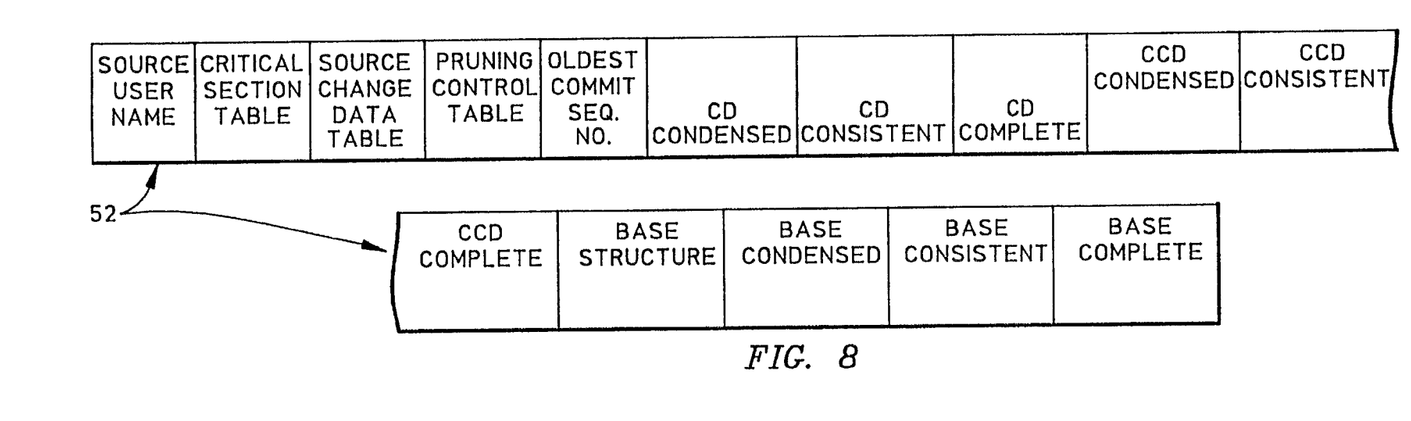
FIG. 8 is a representation of the structure of the Change_Data_Control table illustrated in FIG. 2.

FIG. 8 is a simplified representation of the structure of the Change_Data_Control table showing the more important column attributes. The Change_Data_Control table will link each Change_Data table with one of the source user tables 28. The Change_Data_Control table provides a means of specifying a host of control parameters, including copy mode flags, table names, user identification, and the like. For example, as shown in FIG. 8, the Change_Data_ Control table preferably includes the name of the source user table whose updates are being propagated, the name of the Critical_Section table used to control access to the associated Change_Data table, the name of the Change_Data table for the source table, the name of the Pruning_Control table 36, the commit sequence number of the oldest row remaining in the Change_Data table, an attribute to specify if the Change_Data table is condensed, and attribute flags to indicate whether the change data is transaction consistent or complete, along with similar parameters for the Consistent_ Change_Data table.

In particular, the CD "condensed" attribute flag always is set to "N" to indicate the Change_Data table is not condensed, meaning that all changes must remain in the table. The CCD condensed attribute can be set to "Y" for indicating that changes may be removed from the Consistent_ Change_Data table, "N" for indicating that all changes must remain in the table, or to "P" for indicating that the Consistent_Change_Data table is permitted to be condensed. The CD "consistency" attribute can be set to "T" to indicate that SQL compensation updates are not included in the change operation data of the Change_Data table or can be set to "C" for indicating that SQL compensation updates are included. The CCD consistency attribute refers to the same characteristics with respect to the associated Consistent_Change_Data table. The CD "completeness" attribute always is set to "N" (no) to indicate the Change_Data table is not complete, while the CCD completeness attribute can be set to "Y" (yes) or to "N" (no) to indicate completeness with respect to the associated Consistent_Change_Data table. With respect to the "completeness" attribute, a table is said to be complete if there is a row for every primary key value of interest that is present in the base, or source, table. An incomplete table may be missing primary keys and the rows they identify.

In the Change_Data_Control table, the base structure attribute can be set to flags indicating a user table, a Consistent_Change_Data table, a snapshot or point-in-time copy, a base aggregate table, or a change aggregate copy. The "base condensed" attribute flag can be set to "Y", "P", or "N". The base condensed flag also can be set to "A" for indicating a base aggregate or change aggregate source table. Similarly, the base consistent and base complete attributes indicate the same characteristics for the source table as associated with the like-named Change_Data attributes of the Change_Data_Control table, although it should be noted that for a source table that is a user table, the base consistent attribute must be "T" and the CD consistent attribute must be "C".

Figure 9:
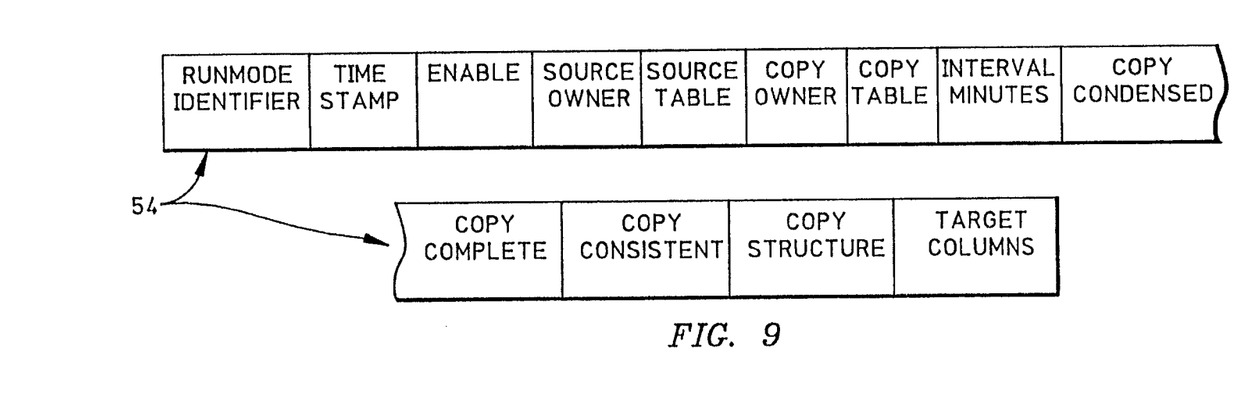
FIG. 9 is a representation of the structure of the Refresh_Control table illustrated in FIG. 2.

FIG. 9 is a simplified representation of the structure of the Refresh_Control table 54 showing the more important column attributes. The Refresh_Control table contains identifiers for a source-based table and associated attributes, a target table and associated attributes, and an indication of how refresh operations will be scheduled and carried out. For example, as shown in FIG. 9, the table includes a runmode identifier that can be set to "FA" for indicating that a full refresh algorithm to append rows to the copy in accordance with log sequence numbers is to be used. Alternatively, the runmode identifier can be set to "FR" for indicating that a refresh algorithm for full refresh with prior delete to replace the copy is to be used. Similarly, a runmode identifier set to "AO" refers to automatic refresh with logic that completes a differential refresh operation if it is not possible to distinguish between reduced update activity and a disabled log read program, a runmode identifier set to "AP" refers to a refresh algorithm in which the differential refresh cycle is not completed and if it is not possible to distinguish between reduced update activity and log read program failure, a failure is assumed, and, lastly, a runmode identifier can be set to "EI" for indicating an immediate execution operation. The Refresh_Control table also includes a time stamp value that is set to null initially and whenever a full refresh (initialization) is attempted and fails. The time value otherwise corresponds to the approximate value of the last successful full refresh operation, which should correspond to the previously read time value from the activity log 32. The Refresh_Control table also includes attributes for interval minutes, which is the value in minutes for the refresh cycle time. At the expiration of the interval, the source table will be refreshed.

Figure 10:
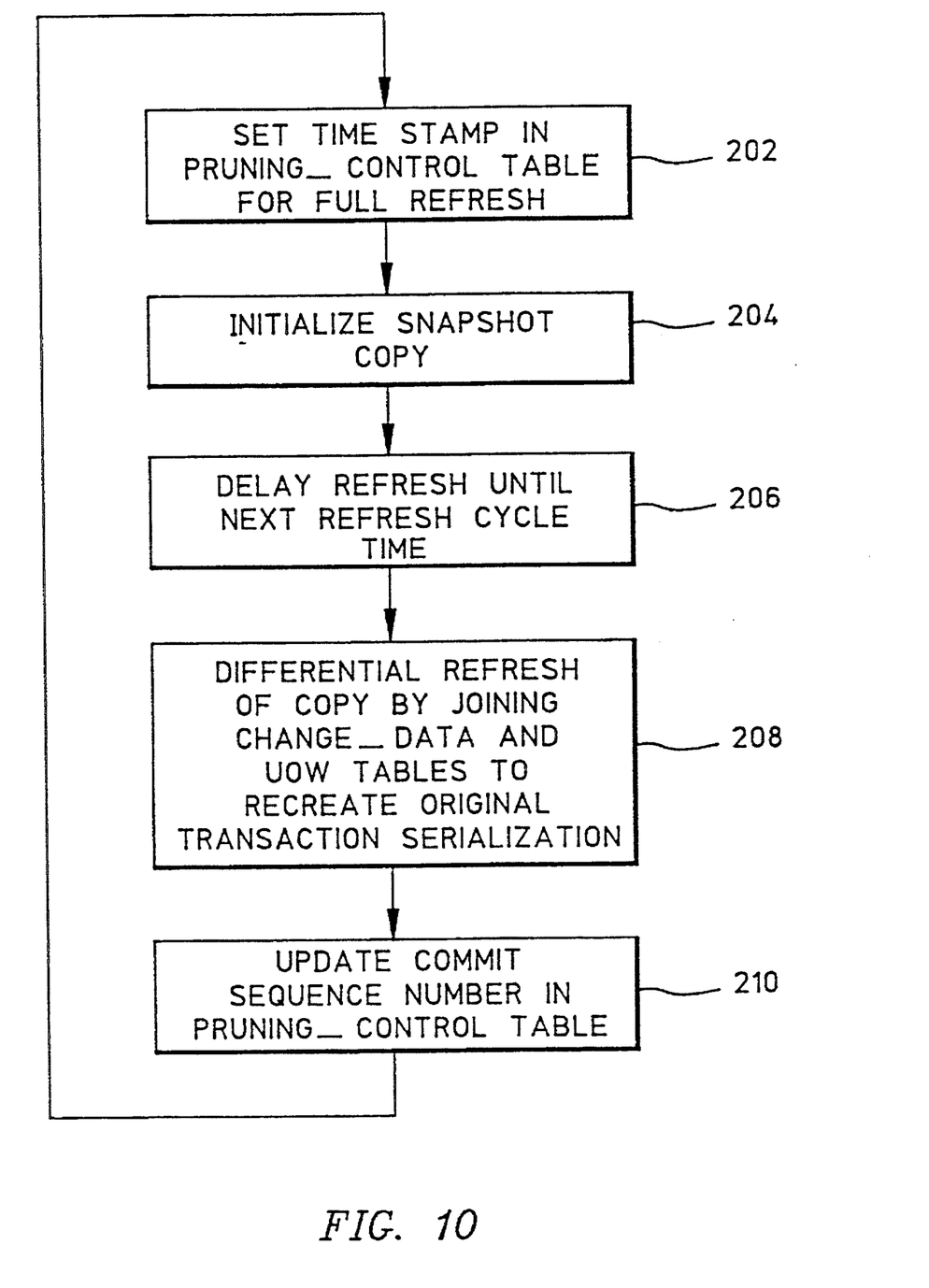
FIG. 10 is a flow diagram illustrating the operation of the Apply Processor illustrated in FIG. 2.

The operation of the system 10 and of the Apply Processor and Log Read Processor will next be described with reference to the flow diagrams of FIGS. 10 and 11. With respect to the general operation of the system, the data base management system schedules user applications programs and thereby permits users to make updates to the user tables. The data base manager automatically logs the updates by writing the update activity in the activity log. After each transactional update, a user either issues a commit order to commit the update or issues a roll-back order to abort the update. Turning now to FIG. 10, when a user requests a snapshot copy, at the flow diagram box numbered 202, the Apply Processor sets a time stamp value in the Pruning_Control table to indicate that a full refresh operation is desired. At the flow diagram box numbered 204, the Apply Processor initializes a snapshot copy comprising a selected portion of a user table. As part of the snapshot definition, a user specifies a refresh cycle parameter in the Refresh_Control table. At the flow diagram box numbered 206, the Apply Processor delays further refresh activity until the next refresh cycle specified by the user.

Next, at the flow diagram box numbered 208, the Apply Processor causes a differential refresh of the snapshot copy by joining the Change_Data and UOW tables to apply only updates that were committed since the last time stamp was set or since the last differentially applied updates, in the order of commit sequence number for each committed transaction. Within each transaction, the change operations are ordered by intent sequence number. In this way, the original transaction serialization is recreated at the user site. Finally, at the flow diagram box numbered 210, the Apply Processor updates the commit sequence number in the Pruning_Control table to reflect the applied updates, indicating the progress in updating the snapshot copy. The Apply Processor then returns to the flow diagram box numbered 206 to wait for the next refresh cycle.

Before the Apply Processor can join the Change_Data and UOW tables, the Log Read Processor must read the activity log, extract the necessary information, and insert it into the rows of the Change_Data and UOW tables. In FIG. 10, the first step of this process is reflected at the flow diagram box numbered 302, which indicates that the Log Read Processor scans the transaction log. Next, at the decision box numbered 304, the Log Read Processor test to determine if it has read a time stamp value, from an update to the Pruning_Control table, indicating that a new snapshot copy was initialized. If the test outcome is affirmative, then at the flow diagram box numbered 306, the Log Read Processor writes an update back to the Pruning_Control table with the log sequence number corresponding to the time stamp. This time stamp value will be used to annotate all records read from the activity log until the next time stamp is read. The Log Read Processor then returns to the flow diagram box numbered 302 to read the next record.

If the outcome at the decision box numbered 304 is negative, meaning that the Log Read Processor did not read a new copy time stamp, then the processor next proceeds to check for finding an update to a table that is a source for a refresh operation, indicated at the decision box numbered 308. If the decision outcome is affirmative, then at the box numbered 310 the Log Read Processor inserts the data from the activity log record into a Change_Data table, including the sequence number, operation information, and unit-of-work identification. The Log Read Processor then returns to the box numbered 302 to continue reading the activity log. If the outcome at the decision box numbered 308 was negative, then at the decision box numbered 312 the Log Read Processor next determines if the record it read from the activity log was a commit operation to the updates made to a copy source snapshot table.

If the outcome of the decision box 312 is affirmative, then at box 314 the Log Read Processor inserts the commit information into the UOW table, including the best approximate commit time, the UOW identification number, and log sequence numbers corresponding to the commit time. The best approximate commit time corresponds to the most recent previously read time stamp value. The Log Read Processor then continues with processing at the box numbered 302. If the Log Read Processor did not find a copy source update commit at box 312, then at decision box 316 it determines if the threshold values indicate it is time to commit. That is, if a command indicates it is time to commit, then at box 318 the Log Read Processor issues a commit order. If it is not time to commit, then the Log Read Processor returns to the flow diagram box numbered 302 to continue processing.

Figure 11:
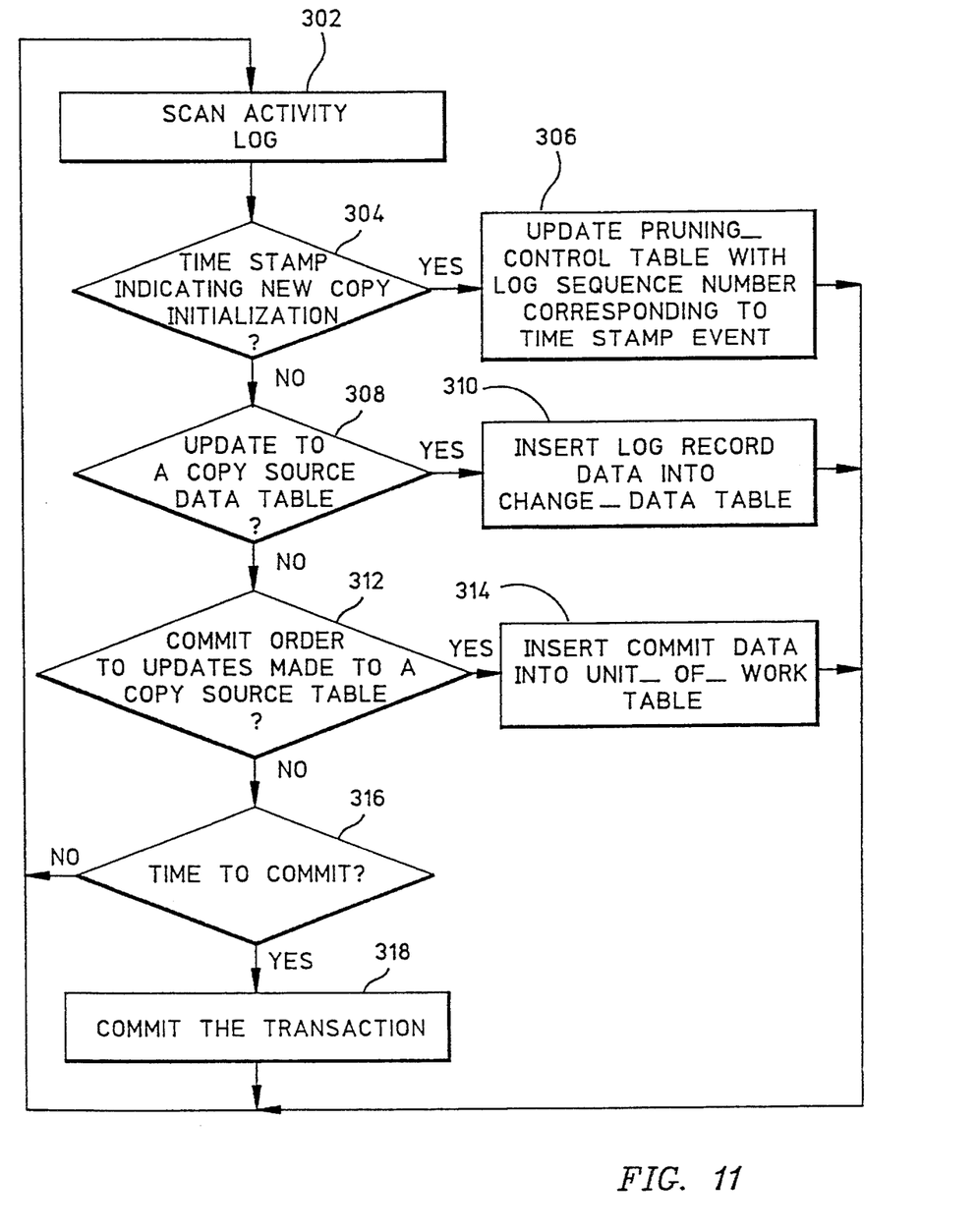
FIG. 11 is a flow diagram illustrating the operation of the Log Read Processor illustrated in FIG. 2.

FIG. 10 and FIG. 11, along with the accompanying descriptions above, explain the system activity in maintaining the activity log and the UOW, Change_Data, and Consistent_Change_Data tables, along with other associated tables of the computing system 10. The lossless distribution of change operation data from copy to copy in the system is possible because the Consistent_Change_Data table provides a means of linking the change operation data in the Change_Data table associated with a user table to all copies derived from the user table. For example, when a snapshot table is copied to a target table, the Consistent_Change_Data table associated with the snapshot is copied to a Consistent_Change_Data table associated with the target. Similarly, if a subset of a snapshot table is extracted and copied to a target table, such as through an SQL search operation, then the associated snapshot Consistent_Change_Data is extracted and copied to the target Consistent_Change_Data table. Alternatively, a user can specify a desire not to include such update information in a target table by indicating in the Refresh_Control table that the target table is to be maintained incomplete. The linking of change operation data from copy to copy is used by the system when copies are refreshed. This aspect of the system operation now will be described in conjunction with FIG. 12.

Figure 12:
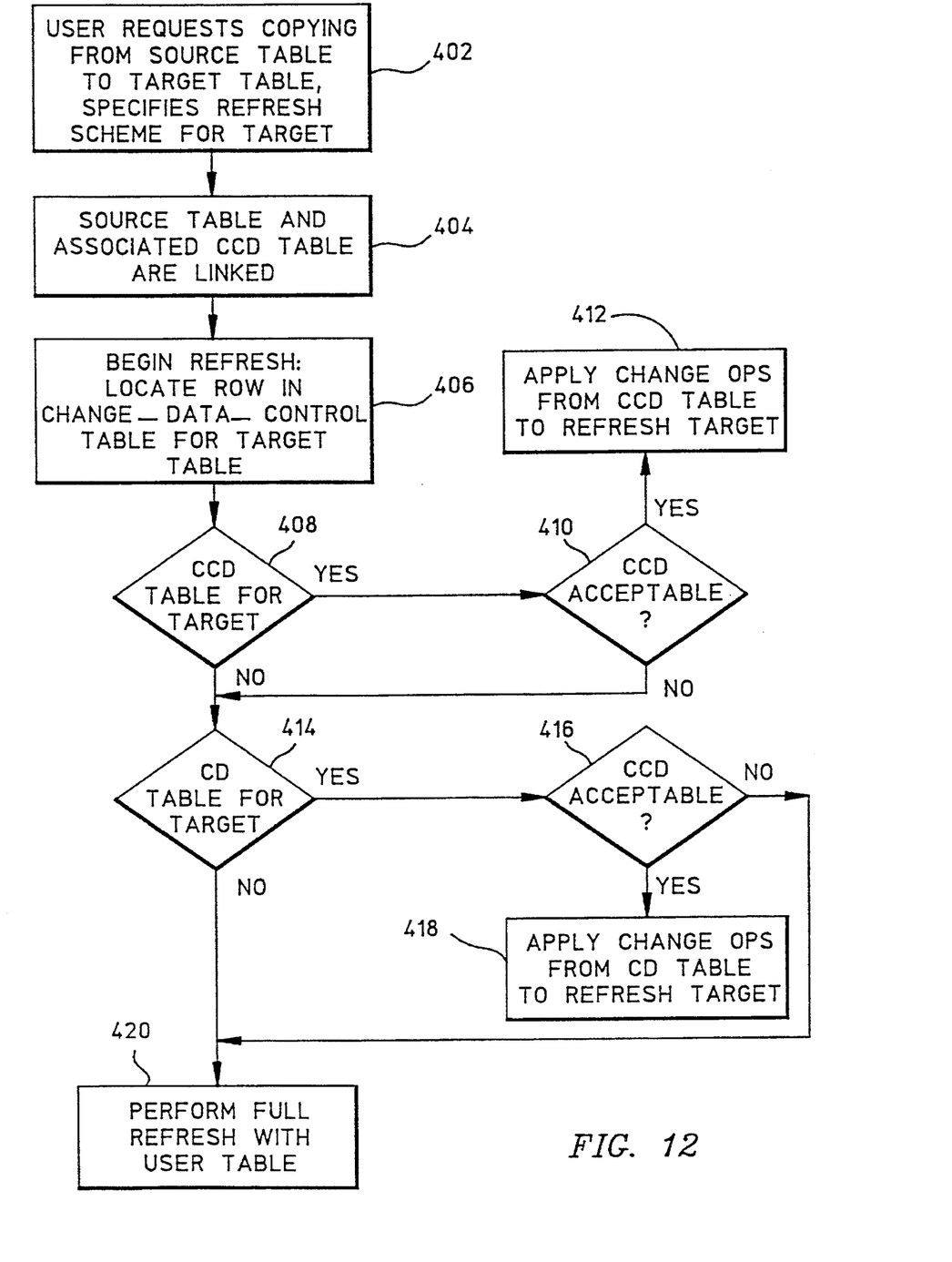
FIG. 12 is a flow diagram illustrating the copy and refresh operation of the system illustrated in FIG. 2.

FIG. 12 shows that, when a copy of a table is made, the Consistent_Change_Data table also is copied, as described above. This is indicated by the flow diagram box numbered 402, where a user requests copying a source table to a target table, and box 404, which indicates that the Apply Processor ensures the change operation data is linked by linking table names in attributes of the Reference_Control table or by copying some or all of the Consistent_Change_Data table when the copy is made. The flow diagram box numbered 406 indicates that later, when the target table is to be refreshed (as specified by the interval attribute in the Refresh_Control table), the Apply Processor determines the user table from which the target table was derived by checking the Change_Data_Control table for the information (see FIG. 8). Thus, in the context of FIG. 12, a "target" table is the table to be refreshed. It can be, for example, a snapshot or a copy of a snapshot.

In the preferred embodiment, the Apply Processor can select between Change_Data, Consistent_Change_Data, and user tables for performing updates. The Apply Processor follows a hierarchy of refreshing, first performing a differential refresh with change information from a Consistent_Change_Data table, then with change information from a Change_Data table if the Consistent_Change_Data table is not acceptable (such as if it is not complete or is condensed), and lastly performing a full refresh with the user table from which the target table was derived if the Change_Data table is not acceptable (such as if it has not been defined). Thus, when a refresh is to be performed, if appropriate columns in the Change_Data_Control table indicate that the user table has an associated Consistent_Change_Data table, an inquiry indicated by the decision box numbered 408, then the Apply Processor will check to see if the Consistent_Change_Data table is complete, as indicated at the decision box numbered 410.

If the associated Consistent_Change_Data table is complete, then the Apply Processor will apply the committed change operations from the Consistent_Change_Data table to the source table named in the Refresh_Control table entry for the target table, as indicated by the flow diagram box numbered 412. The steps involved in applying change operations should be known to those skilled in the art and can be performed, for example, by standard SQL routines. That is, the refresh operation itself should be understood and will not be described in greater detail. If the Consistent_Change_Data table is not complete, then the Apply Processor next checks to see if a suitable Change_Data table exists, as indicated by the box numbered 414. If the Apply Processor determined at box 408 that the user table was not associated with a Consistent_Change_Data table, then the Apply Processor also will check for a suitable Change_Data table at box 414.

If appropriate columns in the Change_Data_Control table indicate that the user table has an associated Change_Data table, then the Apply Processor will check to see if the Change_Data table is acceptable for applying changes, as indicated at the decision box numbered 416. If the associated Change_Data table is acceptable, then the Apply Processor will apply the committed change operations from the Change_Data table to the source table named in the Refresh_Control table entry for the target table, as indicated by the flow diagram box numbered 418. As noted above, committed change operations are derived by joining the UOW table with the Change_Data table. If the Change_Data table is not acceptable, then the Apply Processor must obtain the updated rows from the user table for refreshing the target table, as indicated by the box numbered 420. If the Apply Processor determined at box 414 that the user table was not associated with a Change_Data table, then the Apply Processor also must perform a full refresh from the user table, indicated at box 420. The Apply Processor is then ready for the next refresh cycle.

Thus, the computer system 10 constructed in accordance with the invention permits multiple copies of data tables to be made without losing change information from copy to copy. The system permits refresh operations to be made on a target table copied from a source table by copying only the changes to the source table through a Consistent_Change_Data table. Such lossless distribution of change information is ensured by defining the Consistent_Change_Data table structure to include columns for committed user change operations, time stamp value associated with the change operations, intent sequence number, and commit sequence number.

The present invention has been described above in terms of a presently preferred embodiment so that an understanding of the present invention can be conveyed. There are, however, many configurations for data base management systems not specifically described herein but with which the present invention is applicable. The present invention should therefore not be seen as limited to the particular embodiment described herein, but rather, it should be understood that the present invention has wide applicability with respect to data base management systems generally. All modifications, variations, or equivalent arrangements that are within the scope of the attached claims should therefore be considered to be within the scope of the invention.

I claim:

1. A method of operating a computer processing system that receives transactional updates comprising sequences of data change operations to source data tables in a data base and records them into an activity log for later retrieval, the method comprising the steps of:

generating a consistent change data table from the retrieved activity log such that the consistent change data table contains a column for storing data change operations of a received transactional update and columns for a commit sequence number, an intent sequence number, and an indicator of the data change operation, such that the consistent change data table contains committed change operations retrieved from the activity log in the order in which they were committed, beginning with a time no earlier than a last prior refresh operation; and performing multiple refresh operations and producing copies of source data tables through multiple generations of copies by applying the consistent change data table entries to the last prior refreshed copy.

2. A method as defined in claim 1, wherein the step of producing copies includes performing a full refresh operation by applying source data table entries.

3. A method as defined in claim 1, further including the step of:

generating a change data table for each source table, each change data table having a column for storing data change operations for each transactional update and a column for storing an intent sequence number, and an indicator of the data change operation;

wherein the step of producing copies includes performing a copy by applying the change data table entries to the last prior refreshed copy.

* * * * *